(12) United States Patent
Jiwang et al.

(10) Patent No.: US 12,055,353 B2
(45) Date of Patent: Aug. 6, 2024

(54) CONNECTOR AND HEAT SINK

(71) Applicant: Tyco Electronics (Shanghai) Co. Ltd., Shanghai (CN)

(72) Inventors: Jin Jiwang, Shanghai (CN); Liu WenYu, Shanghai (CN); Han Hongqiang, Shanghai (CN); Ge Xingjie, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 538 days.

(21) Appl. No.: 16/881,536

(22) Filed: May 22, 2020

(65) Prior Publication Data

US 2020/0370843 A1    Nov. 26, 2020

(30) Foreign Application Priority Data

May 24, 2019   (CN) .......................... 201910443488.8

(51) Int. Cl.
*F28F 9/26*     (2006.01)
*F28F 1/12*     (2006.01)
*H01R 13/46*    (2006.01)

(52) U.S. Cl.
CPC ................. *F28F 9/26* (2013.01); *F28F 1/12* (2013.01); *H01R 13/46* (2013.01)

(58) Field of Classification Search
CPC ................ F28F 9/26; F28F 1/12; H01R 13/46
USPC ....................................................... 439/487
See application file for complete search history.

(56) References Cited

U.S. PATENT DOCUMENTS

| | | | | |
|---|---|---|---|---|
| 5,241,453 A * | 8/1993 | Bright | .................. | H05K 7/1084 174/351 |
| 6,226,185 B1 * | 5/2001 | Lin | ...................... | H01L 23/4093 174/548 |
| 6,362,961 B1 * | 3/2002 | Chiou | ....................... | G06F 1/20 248/510 |
| 6,442,026 B2 * | 8/2002 | Yamaoka | .................. | G06F 1/20 257/E23.102 |
| 6,476,484 B1 * | 11/2002 | Liang | .................. | H01L 23/4093 257/725 |
| 6,547,580 B1 * | 4/2003 | Leavitt | ................... | H01R 12/88 439/73 |
| 6,685,486 B1 * | 2/2004 | Zhang | .................. | H01R 12/707 439/79 |
| 7,044,804 B2 * | 5/2006 | Han | ..................... | G02B 6/4292 439/577 |

(Continued)

*Primary Examiner* — Raheena R Malik
(74) *Attorney, Agent, or Firm* — Barley Snyder

(57) ABSTRACT

A connector includes a housing, a heat sink mounted on a top wall of the housing, and an elastic clip. The housing has an inserting cavity, a first connecting portion on a first side, and a second connecting portion on a second side. The heat sink has a base, a heat sink body mounted on the base, and a through hole formed at a bottom of the heat sink body and extending laterally through the heat sink body. The elastic clip has an elastic lateral beam extending laterally through the through hole. The elastic lateral beam has a first mating connecting portion at a first end and a second mating connecting portion at a second end. The first mating connecting portion engages the first connecting portion and the second mating connecting portion engages the second connecting portion, elastically holding the heat sink on the top wall.

17 Claims, 5 Drawing Sheets

(56) References Cited

U.S. PATENT DOCUMENTS

| | | | | |
|---|---|---|---|---|
| 7,382,622 B2* | 6/2008 | Li | H01L 23/4093 | 165/185 |
| 7,539,018 B2* | 5/2009 | Murr | H05K 7/20418 | 439/372 |
| 7,601,021 B1* | 10/2009 | Yang | G02B 6/4261 | 439/487 |
| 7,625,223 B1* | 12/2009 | Fogg | H05K 5/0247 | 439/607.3 |
| 7,632,128 B2* | 12/2009 | Lin | H01L 23/4006 | 439/331 |
| 7,667,972 B2* | 2/2010 | Chen | H05K 7/2049 | 165/185 |
| 7,766,691 B2* | 8/2010 | Pandey | H01L 23/427 | 361/709 |
| 7,780,469 B2* | 8/2010 | Zschieschang | H05K 3/303 | 361/709 |
| 8,327,921 B2* | 12/2012 | Zha | F28D 15/0275 | 165/104.21 |
| 8,885,342 B2* | 11/2014 | Skepnek | H01L 23/433 | 174/548 |
| 8,905,775 B2* | 12/2014 | Yeh | H01L 23/4093 | 165/185 |
| 8,905,794 B2* | 12/2014 | Chawla | H01R 12/724 | 439/682 |
| 8,995,133 B2* | 3/2015 | Wieland | H05K 7/20927 | 363/141 |
| 11,217,941 B1* | 1/2022 | Yang | H01R 12/724 | |
| 2013/0323963 A1* | 12/2013 | Morrison | H05K 9/0058 | 174/377 |
| 2018/0090863 A1* | 3/2018 | Yang | H01R 13/6594 | |
| 2018/0331459 A1* | 11/2018 | Liu | H01R 13/6583 | |
| 2019/0051580 A1* | 2/2019 | Liu | H01L 23/4093 | |
| 2019/0230817 A1* | 7/2019 | Han | F28F 3/06 | |
| 2019/0288448 A1* | 9/2019 | Liu | H01R 13/506 | |
| 2019/0288459 A1* | 9/2019 | Jin | H01R 13/6587 | |
| 2019/0296502 A1* | 9/2019 | Liu | H01R 12/58 | |
| 2020/0312745 A1* | 10/2020 | Liu | H01R 13/508 | |

* cited by examiner

CONNECTOR AND HEAT SINK

CROSS-REFERENCE TO RELATED APPLICATION

This application claims the benefit of the filing date under 35 U.S.C. § 119(a)-(d) of Chinese Patent Application No. 201910443488.8, filed on May 24, 2019.

FIELD OF THE INVENTION

The present invention relates to a connector and, more particularly, to a connector having a heat sink.

BACKGROUND

A high-speed optoelectronic connector generally comprises a housing (otherwise known as an iron cage), a heat sink mounted on a top wall of the housing, and an elastic clip for holding the heat sink on the housing. The elastic clip may directly press and hold the heat sink against the top wall of the housing. A slot for holding the elastic clip is formed in the heat sink, and a sealing sheet is required to be provided in the slot to prevent air from escaping in order to achieve better heat dissipation effect, which increases part and assembly cost. In addition, it is impossible for a lower heat sink to achieve a bottom connection due to manufacturing process and strength requirements, so that only a multi-section heat sink can be adopted, which increases the die cost and welding time cost of the heat sink.

SUMMARY

A connector includes a housing, a heat sink mounted on a top wall of the housing, and an elastic clip. The housing has an inserting cavity, a first connecting portion on a first side, and a second connecting portion on a second side. The heat sink has a base, a heat sink body mounted on the base, and a through hole formed at a bottom of the heat sink body and extending laterally through the heat sink body. The elastic clip has an elastic lateral beam extending laterally through the through hole. The elastic lateral beam has a first mating connecting portion at a first end and a second mating connecting portion at a second end. The first mating connecting portion engages the first connecting portion and the second mating connecting portion engages the second connecting portion, elastically holding the heat sink on the top wall.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
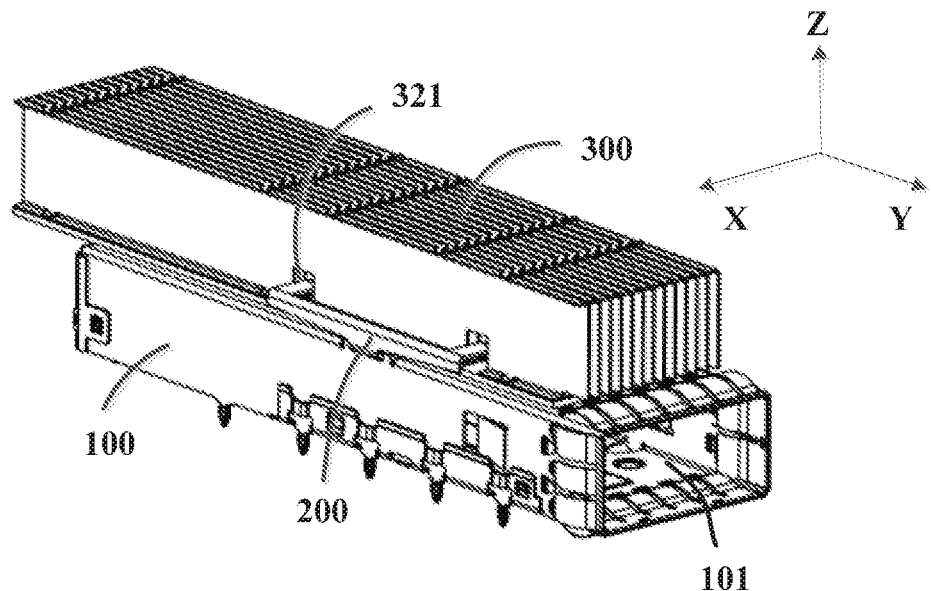
FIG. 1 is a perspective view of a connector according to an embodiment.
Figure 2:
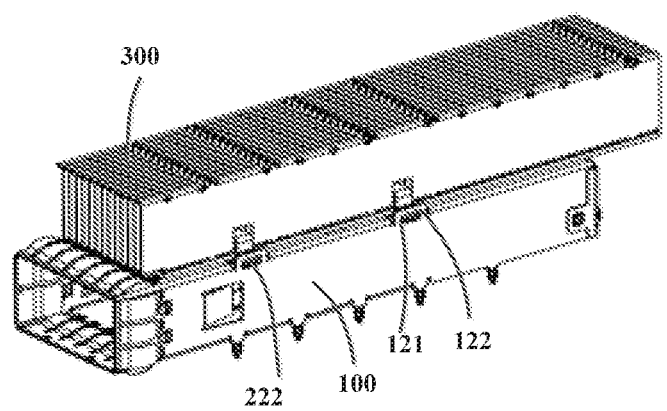
FIG. 2 is another perspective view of the connector of FIG. 1.

Technical solutions of the present disclosure will be described hereinafter in detail with reference to these embodiments in conjunction with the accompanying drawings, wherein the same or similar reference numerals refer to the same or similar elements. The following description of the embodiments of the present disclosure with reference to the accompanying drawings is intended to illustrate the general inventive concept of the invention, and should not be construed as limiting the invention.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A connector according to an embodiment, as shown in FIGS. 1-4, comprises a housing 100, a heat sink 300, and at least one elastic clip 200.

As shown in FIGS. 1-4, the housing 100 has or defines an inserting cavity 101, and the housing 100 has a first side and a second side opposite to each other in a lateral direction X of the inserting cavity 101, a first connecting portion 111 being formed on the first side of the housing 100, and a second connecting portion 121 being formed on the second side of the housing 100. In the embodiments shown in FIGS. 1-8, the housing 100 has a top wall 110, a bottom wall, and a pair of side walls 120, the first connecting portion 111 being formed on one side wall 120 of the pair of side walls 120, and the second connecting portion 121 being formed on the other side wall 120 of the pair of side walls 120.

The heat sink 300, as shown in FIGS. 1-4, is mounted on a top wall 110 of the housing 100 and has a base 310 and a heat sink body 320 mounted on the base 310. The heat sink 300 has at least one through hole 321 formed at the bottom of the heat sink body 320 and extending laterally through the heat sink body 320. The heat sink 300 may be, for example, a finned heat sink.

Figure 4:
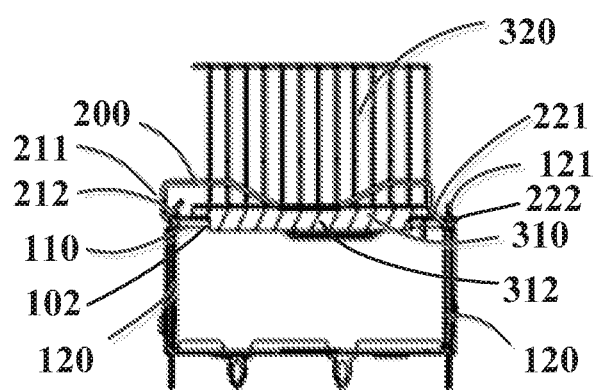
FIG. 4 is a sectional end view of the connector of FIG. 1.
Figure 7:
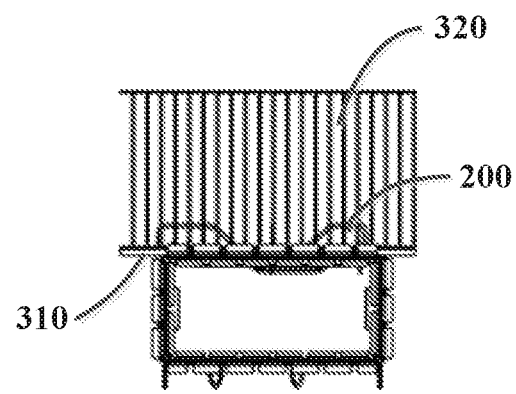
FIG. 7 is a sectional end view of the connector of FIG. 5.
Figure 8:
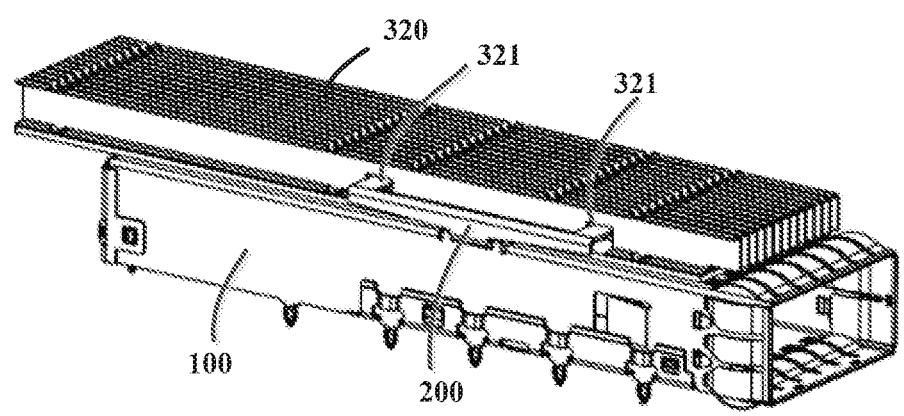
FIG. 8 is a perspective view of a connector according to another embodiment.

In the embodiment shown in FIGS. 4 and 7, an opening 102 is formed in the top wall 110 of the housing 100, and a boss 312 is provided at the bottom of the base 310 and protrudes downwardly into the inserting cavity 101 via the opening 102 so as to be in physical contact with a light module inserted into the inserting cavity 101.

Each elastic clip 200, as shown in FIGS. 1-4, has at least one elastic lateral beam (for example, in the illustrated embodiment, two elastic lateral beams 220, 230), a first mating connecting portion 211, and a second mating connecting portion 221. Each elastic lateral beam 220, 230 extends laterally through the through hole 321 of the heat sink body 320 and has a first end and an second end opposite to the first end. The first mating connecting portion 211 is provided on the first end of the elastic lateral beam 220, 230 and adapted to be engaged with the first connecting portion 111 of the housing 100, and the second mating connecting portion 221 is provided on the second end of the elastic lateral beam 220, 230 and adapted to be engaged with the second connecting portion 121 of the housing 100, thereby resiliently holding the heat sink 300 on the top wall 110 of the housing 100. In the embodiment shown in FIGS. 3, 4, 7 and 9, the two elastic lateral beams 220, 230 are arc-shaped elastic lateral beams bending downwardly. In the embodiments shown in FIGS. 1-8, the first connecting portion 111 protrudes upwardly from the top wall 110 of the housing 100 so as to engage with the first mating connection portion 211, and the second connecting portion 121 protrudes upwardly from the top wall 110 of the housing 100 so as to engage with the second mating connection portion 221.

Figure 3:
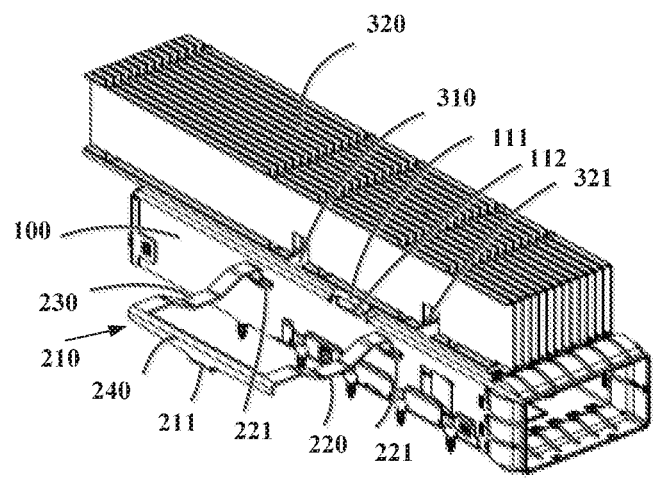
FIG. 3 is a perspective view of the connector of FIG. 1 with an elastic clip not mounted to a housing.

In an exemplary embodiment of the present disclosure, as shown in FIG. 3, the elastic clip 200 further comprises an operating portion 210 provided at the first end of the elastic lateral beam 220, 230 and adapted to be operated by an operator to assemble the elastic clip 200 in the connector.

In the embodiment shown in FIGS. 1-4, the through hole 321 is a recess formed on one side of the heat sink body 320 adjacent to the base 310. It will be appreciated by those skilled in the art that in some other embodiments of the present disclosure, the through hole 321 may also be formed by cutting a lower portion of the heat sink body 320, i.e. the through hole 321 is not positioned between the heat sink body 320 and the base 310, rather than positioned in the heat sink body 320.

In the embodiment shown in FIGS. 1-4, a first connecting hole 112 is provided in the first connecting portion 111, and a second connecting hole 122 is provided in the second connecting portion 121. The first mating connecting portion 211 is provided with a first hook 212 configured to be engaged with the first connecting hole 112, and the second mating connecting portion 221 is provided with a second hook 222 configured to be engaged with the second connecting hole 122. The first hook 212 is connected into the first connecting hole 112 of the first connecting portion 111 from an outer side of the first connecting portion 111 away from the second connecting portion 121, and the second hook 222 is connected into the second connecting hole 122 of the second connecting portion 121 from an inner side of the second connecting portion 121 facing the first connecting portion 111. In this way, the reliability of connection may be improved.

In the embodiment shown in FIGS. 1-4 and 9, each elastic clip 200 has two elastic lateral beams 220, 230, the operating portion has a longitudinal beam 240 connected between the first ends of the two elastic lateral beams 220, 230, and the first mating connecting portion 211 is formed on the longitudinal beam 240. In the embodiment shown in FIGS. 3 and 9, the two elastic lateral beams 220, 230 are connected to an upper edge of the longitudinal beam 240, respectively. In an embodiment shown in FIGS. 1, 3 to 5, and 9, the first mating connecting portion 211 is connected to a lower edge of the longitudinal beam 240. In the embodiment shown in FIGS. 1, 3 and 5, one first hook 212 is formed on the longitudinal beam 240 and positioned at a middle position of the longitudinal beam 240 in a length direction Y of the longitudinal beam 240. It will be appreciated by those skilled in the art that in other embodiments of the present disclosure, the elastic clip may comprise one or more than two elastic lateral beams.

In the embodiment shown in FIGS. 1-4, the elastic lateral beams 220, 230 extend in the lateral direction X, the longitudinal beam 240 is positioned on one side of the heat sink 300 in the lateral direction X, and the longitudinal beam 240 extends in a direction perpendicular to the lateral direction X. In another embodiment, the longitudinal beams 240 of two adjacent elastic clips 200 are positioned on opposite sides of the heat sink 300 in the lateral direction X, respectively.

Figure 5:
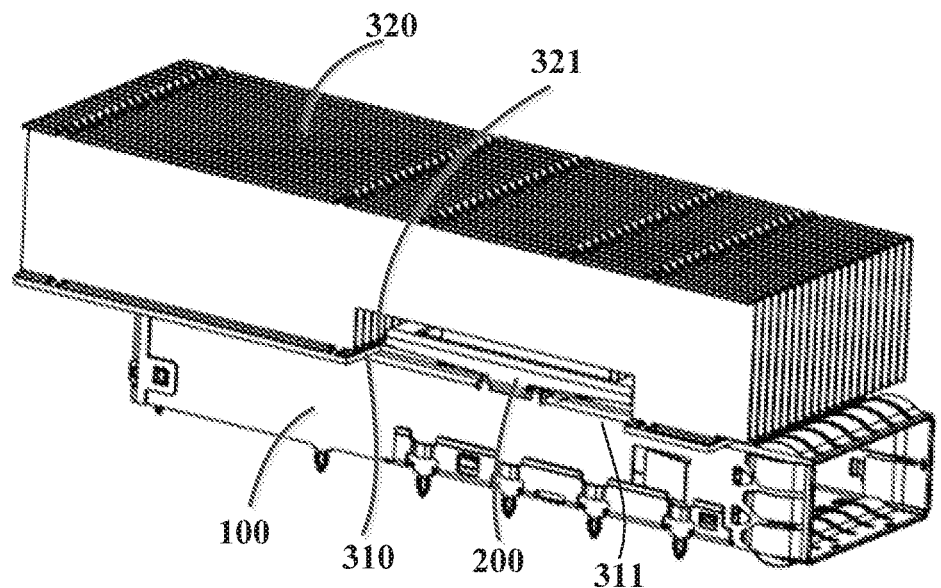
FIG. 5 is a perspective view of a connector according to another embodiment.
Figure 6:
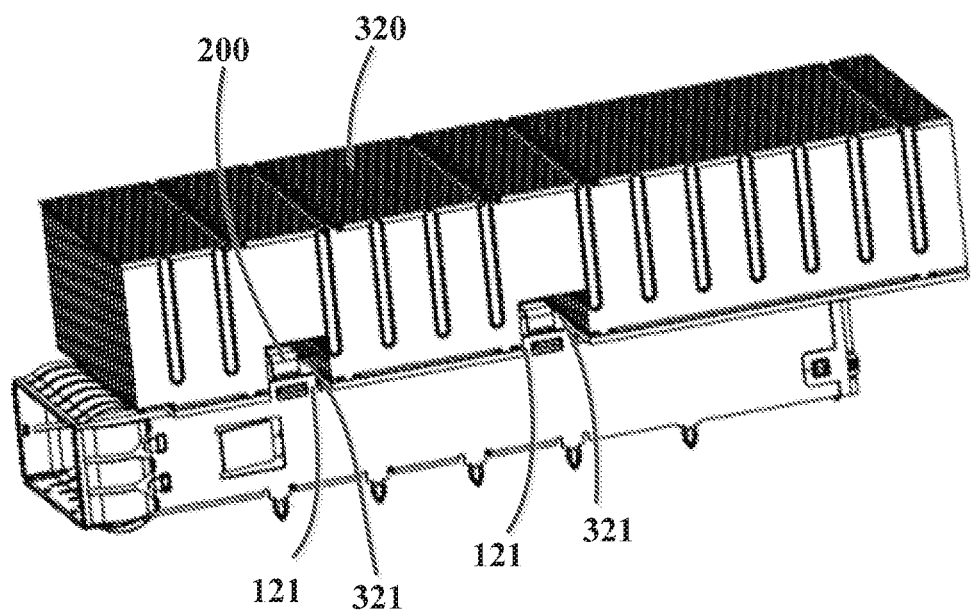
FIG. 6 is another perspective view of the connector of FIG. 5.

In another embodiment shown in FIGS. 5 and 6, a width of the heat sink 300 in the lateral direction X is greater than a width of the housing 100 in the lateral direction X, and a notch 311 is provided at a portion of the base 310 corresponding to the through hole 321, such that two opposite sides of the base 310 at positions corresponding to the through hole 321 in the lateral direction X are positioned inwardly from the first side and the second side of the housing 100 in the lateral direction X. In this way, the connector may be applied to a wider heat sink 300 by leaving a mounting space at the bottom of the heat sink body 320. In the embodiment shown in FIGS. 5 and 6, the longitudinal beam 240 is at least partially positioned directly below the heat sink 300.

Figure 9:
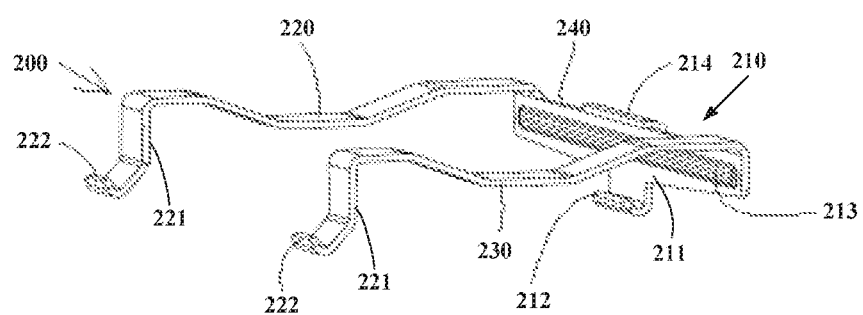
FIG. 9 is a perspective view of an elastic clip according to another embodiment.

An elastic clip 200 according to another embodiment is shown in FIG. 9. In the embodiment shown in FIG. 9, at least one reinforcing rib 213 is formed on the longitudinal beam 240 and protrudes inwardly or outwardly, the reinforcing rib 213 extending from one end to the other end of the longitudinal beam 240 in the length direction Y of the longitudinal beam 240. In the embodiment shown in FIG. 9, the operating portion 210 has a pressing portion 214 formed on the longitudinal beam 240, and the pressing portion 214 is positioned at the middle position of the longitudinal beam 240 in the length direction and connected to the upper edge of the longitudinal beam 240, the pressing portion 214 being pressed by the operator so that the first hook 212 is engaged with the first connecting hole 112.

According to the connector and the heat sink 300 of the above embodiments of the present disclosure, the through hole 321 is formed at the bottom of the heat sink body 320 and extends laterally through the heat sink body 320, so that the elastic lateral beam 220, 230 of the elastic clip 200 extends laterally through the through hole 321 to elastically hold the heat sink 300 on the top wall 100 of the housing 100. Because the upper portion of the heat sink 300 is still a complete structure, air cannot escape from the upper portion, thus the sealing sheet may be omitted and the heat dissipation effect is good, and the manufacturing and assembly costs are reduced. In addition, the connector can be applied to a lower heat sink 300 which still remains a one-piece structure, thereby saving manufacturing costs. Moreover, the connector may be applied to a wider heat sink 300.

Although the present disclosure has been described hereinbefore in detail with reference to the attached drawings, it should be appreciated that the disclosed embodiments in the attached drawings are intended to illustrate embodiments of the present disclosure by way of example, and should not be construed as limitation to the present disclosure. Although several exemplary embodiments have been shown and described, it would be appreciated by those skilled in the art that various changes or modifications may be made to these embodiments without departing from the principles and spirit of the disclosure, the scope of which is defined by the claims and their equivalents.

What is claimed is:

1. A connector, comprising:
a housing having an inserting cavity, a first side, a second side opposite to the first side in a lateral direction of the inserting cavity, a first connecting portion on the first side, and a second connecting portion on the second side, the first connecting portion has a first connecting hole and the second connecting portion has a second connecting hole;
a heat sink mounted on a top wall of the housing, the heat sink having a base, a heat sink body mounted on the base, and a through hole formed at a bottom of the heat sink body and extending laterally through the heat sink body; and an elastic clip having an elastic lateral beam extending laterally through the through hole, the elastic lateral beam has a first end and a second end opposite to the first end, a first mating connecting portion at the first end of the elastic lateral beam, and a second mating connecting portion at the second end of the elastic lateral beam, the first mating connecting portion engages the first connecting portion and the second mating connecting portion engages the second connecting portion, elastically holding the heat sink on the top wall, the first mating connecting portion has a first hook engaging the first connecting hole and the second mating connecting portion has a second hook engaging the second connecting hole.

2. The connector of claim 1, wherein the elastic clip has an operating portion at the first end of the elastic lateral beam.

3. The connector of claim 1, wherein the through hole is a recess on a side of the heat sink body adjacent to the base.

4. The connector of claim 1, wherein the first hook is connected into the first connecting hole from an outer side of the first connecting portion distal to the second connecting portion, the second hook is connected into the second connecting hole from an inner side of the second connecting portion facing the first connecting portion.

5. The connector of claim 1, wherein the elastic clip has a pair of elastic lateral beams and a longitudinal beam connected between the first end of each of the elastic lateral beams, the first mating connecting portion is formed on the longitudinal beam.

6. The connector of claim 5, wherein the elastic clip is one of a pair of adjacent elastic clips, the longitudinal beams of the adjacent elastic clips are positioned on opposite side of the heat sink in the lateral direction.

7. The connector of claim 5, wherein a width of the heat sink in the lateral direction is greater than a width of the housing in the lateral direction, the base has a portion corresponding to the through hole with a notch, a pair of opposite sides of the base at the portion are positioned inwardly from the first side and the second side of the housing in the lateral direction.

8. The connector of claim 7, wherein the longitudinal beam is at least partially positioned directly below the heat sink.

9. The connector of claim 5, wherein the first hook is formed on the longitudinal beam and positioned at a middle position of the longitudinal beam in a length direction of the longitudinal beam.

10. The connector of claim 5, wherein the longitudinal beam has a reinforcing rib protruding inwardly or outwardly, the reinforcing rib extends between opposite ends of the longitudinal beam in a length direction of the longitudinal beam.

11. The connector of claim 5, wherein the first mating connecting portion is connected to a lower edge of the longitudinal beam.

12. The connector of claim 1, wherein the elastic lateral beam is an arc-shaped elastic lateral beam bending downwardly.

13. The connector of claim 5, wherein the elastic lateral beams are each connected to an upper edge of the longitudinal beam.

14. The connector of claim 5, wherein the elastic clip has an operating portion with a pressing portion on the longitudinal beam, the pressing portion is positioned at a middle position of the longitudinal beam in a length direction of the longitudinal beams and is connected to an upper edge of the longitudinal beam.

15. The connector of claim 1, wherein the housing has the top wall, a bottom wall, and a pair of side walls, the first connecting portion is formed on one of the pair of side walls and the second connecting portion is formed on the other of the pair of side walls.

16. The connector of claim 15, wherein the first connecting portion and the second connecting portion each protrude upwardly from the top wall of the housing.

17. The connector of claim 15, wherein the top wall of the housing has an opening, a bottom of the base of the heat sink body has a boss protruding downwardly into the inserting cavity via the opening.

* * * * *